May 28, 1935. F. R. FAGEOL ET AL 2,003,257
FARE COLLECTION METHOD AND APPARATUS
Filed Jan. 29, 1931 2 Sheets-Sheet 1
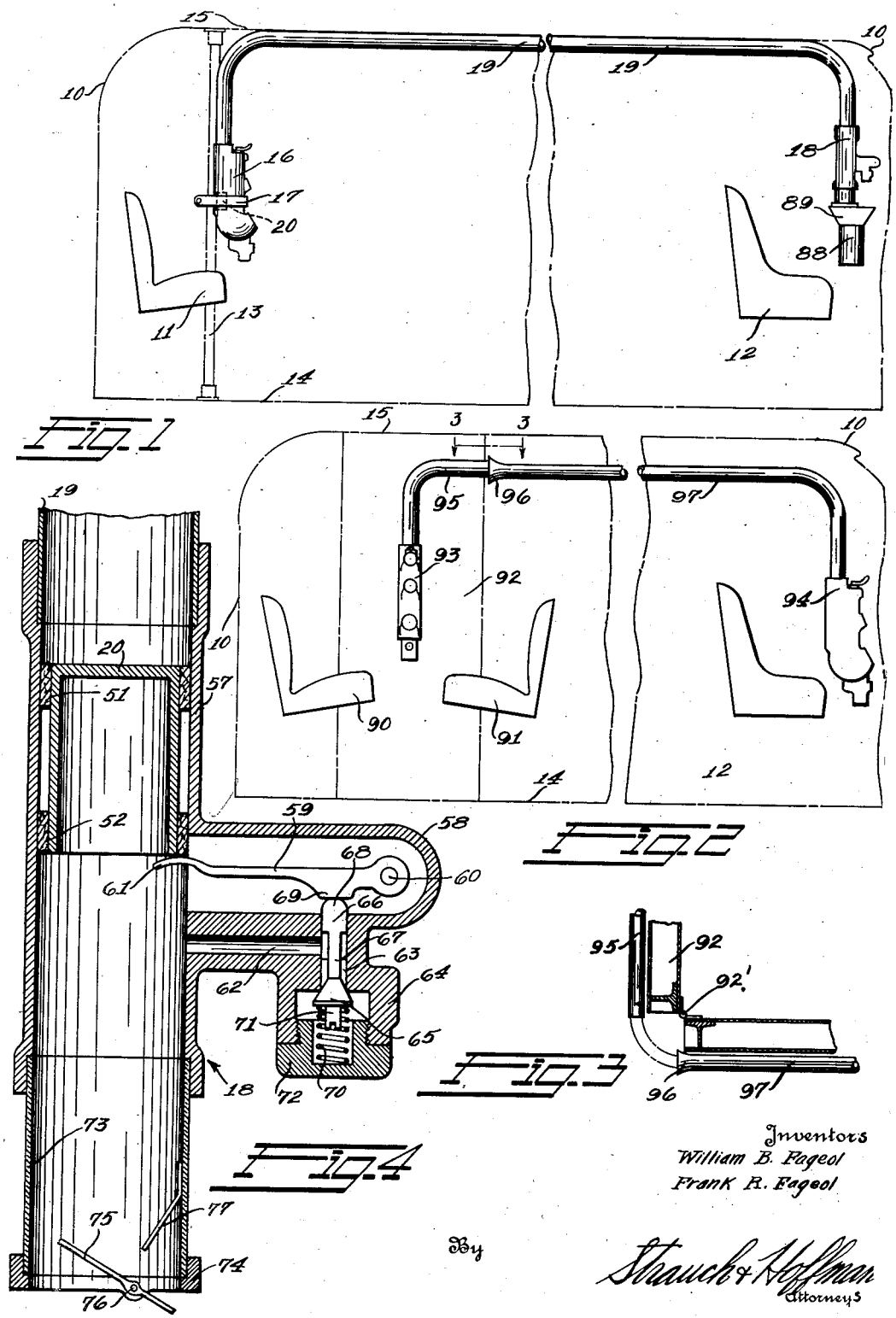
Inventors
William B. Fageol
Frank R. Fageol
By Strauch & Hoffman
Attorneys May 28, 1935.  F. R. FAGEOL ET AL  2,003,257
FARE COLLECTION METHOD AND APPARATUS
Filed Jan. 29, 1931  2 Sheets-Sheet 2
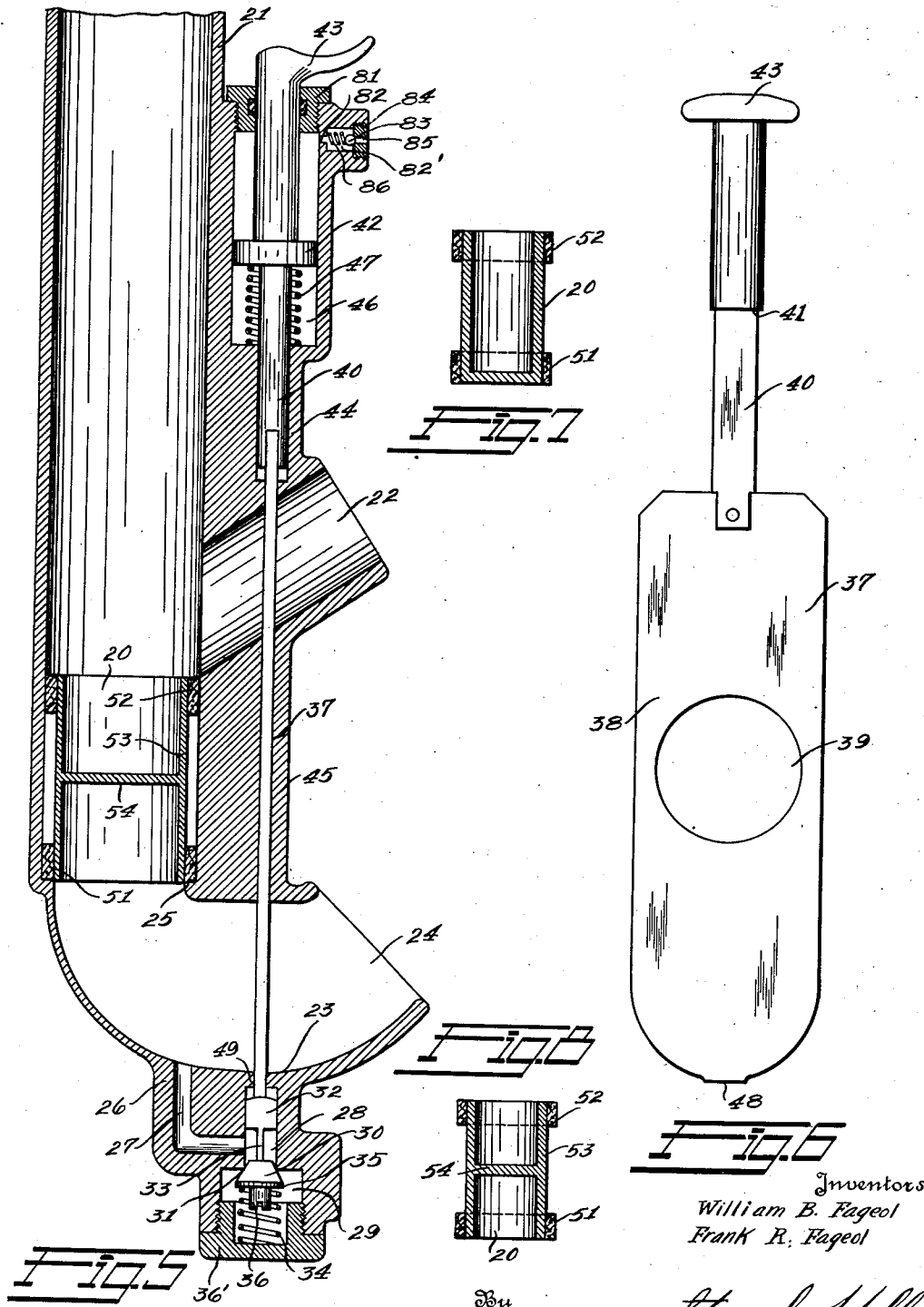
Inventors
William B. Fageol
Frank R. Fageol
By
Strauch & Hoffman
Attorneys Patented May 28, 1935

2,003,257

UNITED STATES PATENT OFFICE 2,003,257

FARE COLLECTION METHOD AND APPARATUS

Frank R. Fageol and William B. Fageol, Kent, Ohio

Application January 29, 1931, Serial No. 512,165

40 Claims. (Cl. 243—3)

This invention relates to a method and apparatus for automatically collecting the fares of passengers using public conveyances of the kind in which the passenger pays a fixed fare for transportation from one point in a zone to any other point within the same zone.

In our application S. N. 480,228, filed September 6, 1930, we have disclosed a vehicle designed so that the passengers may enter the same through a plurality of entrances and assume seats disposed relatively close to said entrances, which vehicle includes arrangements, disposed in proximity to the seats of the vehicle for permitting the passengers to deposit their fares after they have assumed their seats so that delays incident to the use by many passengers of the same entrance, and the collection of fares at said entrance from the unseated passengers, may be avoided.

This invention aims to improve the automatic fare collection system described and claimed in said application by providing an automatic fare collecting system and method by which the fares are physically carried from the various seats, distributed throughout the vehicle, to a common station adjacent the position of the conductor or driver of the vehicle to the end that the arrival of the fare at said station may in itself constitute the indication to the operator of the vehicle that the passenger occupying the seat corresponding to the receiver, in which the fare appears at said common station, has paid his fare.

A further object of the invention is to provide a method and arrangement of providing the passengers occupying the seats of the vehicle with change, when necessary, the change being supplied from a common station adjacent the position of the operator of the vehicle, to the end that the passenger may secure any necessary change to deposit the correct fare in the devices provided for its reception without the necessity of waiting adjacent a single entrance to the vehicle body for the receipt of said change, thus delaying the seating of the passenger and the continuance of the vehicle along its route.

A still further object of the invention is to provide a carrier system for conveying a fare from the seat of a passenger within a public conveyance to a receiving station and to automatically return the carrier to the latter station to its position adjacent passenger seats, whereby the fares may be delivered to the receiving station without requiring the attention of the operator or conductor of the conveyance, except to see that a fare reaches his station from each occupied seat.

A still further object of the invention is to provide a fare delivering system for use in a public conveyance in which the fares are delivered pneumatically to a remote station from a multiplicity of stations disposed in proximity to seats within the conveyance.

A still further object of the invention is to provide a coin conveying system designed to automatically convey a coin deposited in a slot to a remote station by pneumatic means, the pneumatic means being made effective by the simple manipulation of a unitary element that serves to close the slot through which the coin was inserted and substantially simultaneously cause the flow of fluid into the system to bring about the conveyance of the coin to said remote station.

A still further object of the invention is to provide a simple arrangement for automatically returning a coin carrier from one station to another after it has automatically delivered its contents to that station.

Still further objects of the invention will appear as a description thereof proceeds with reference to the accompanying drawings, in which, Figure 1 is a diagrammatic view showing a fare-collecting and conveying system of this invention, and the arrangement of essential parts thereof with respect to seats within the vehicle body, which is shown in outline.

Figure 2 is a diagrammatic view showing the change-making system forming a part of the present invention.

Figure 3 is a detail sectional view taken on the plane indicated by the line 3—3 on Figure 2.

Figure 4 is a sectional view of the receiving end of the fare collecting and conveying system.

Figure 5 is a sectional view of a preferred form of the apparatus for receiving the fare or the money requiring change.

Figure 6 is an elevational view of the unitary element used to simultaneously close the coin receiving or removal openings in the apparatus of Figure 5 and to then actuate the fluid controlling valve.

Figure 7 is a sectional view of the form of carrier preferred for conveying the fares to the collecting station.

Figure 8 is a sectional view showing the preferred form of change-conveying carrier.

Like reference characters indicate like parts throughout the several figures.

This invention is intended particularly for application to public conveyances to enable the operator or conductor of the vehicle to secure the fares of passengers entering the conveyance, or to make change for said passengers without requiring that the passengers pass a common point adjacent his position in order to be able to pay the cost of their transportation. It is customary at the present time to provide fare-receiving devices at one point of a conveyance or vehicle intended for the carrying of passengers from any one point in a zone to any other point in that zone for a fixed fare. The passengers in paying said fare must enter the vehicle at one point so as to pass the fare collecting station, at which station change is likewise given when needed. The passengers do not find seats until after they have paid their fares and, usually, the vehicle remains stationary during said fare collecting and changing operations due to the congestion of passengers in the narrow space ordinarily provided for this purpose at the fare collecting station. As a result the operation of public conveyances of the kind just referred to is greatly delayed and such conveyances cannot effectively compete with the more rapidly operated taxicabs and private vehicles which are being widely used for transportation because of the delays incident to the operation of the less costly conveyances.

While the present invention is intended particularly to solve the problem incident to the operation of conveyances of the kind stated, it will be understood that the invention is capable of being put to many other uses. Preferably, in solving said problem, the invention is used in a vehicle such as described in our copending application above referred to, in which the body of the vehicle is provided with a plurality of openings through which the passengers can promptly enter and assume seats disposed in groups around said openings, to the end that the passengers entering the vehicle can immediately assume seats after the vehicle is halted and the vehicle can then continue on its course without delay. The invention may however be applied to vehicles having entrances and exits of more conventional arrangement, if desired.

Essentially, this invention includes a fare-conveying system having conveyor units leading from a point adjacent the driver's or conductor's position to various points within the vehicle body adjacent the seats occupied by the passengers using it, which system is so designed that the fares are automatically conveyed to the common station upon the initiative of the passenger, giving to the driver or conductor an indication of the passengers who have paid their fares, which system requires no attention on the part of the operator of the vehicle other than to observe the passengers who have paid and to discharge the fares into a common receptacle provided to receive them, and preferably automatically count and register them in well known manner.

This invention also contemplates the provision of separate change-making conveying units located at various points about the vehicle body all of which change-making devices are connected to communicate with a change-making station also disposed adjacent the driver's or conductor's position in the vehicle.

Referring first to the automatic fare-collecting system, as illustrated diagrammatically in Figure 1, the reference numeral 10 designates the outline of the body of the vehicle. Disposed within the vehicle body is a seat 11, which is remote from a driver's seat 12, which, as is customary, is located adjacent the forward end of the body. In order that the vehicle may be accelerated and decelerated rapidly without endangering the passengers who may enter or leave same, while in motion, the vehicle is provided with a plurality of stanchions such as 13, adjacent the several seats extending from the floor line 14 of the vehicle to the roof line 15 thereof. These stanchions provide hand holds to enable the passengers to take their seats immediately upon entering the vehicle, and said hand holds make it unnecessary to delay the starting of the vehicle until the passenger has actually reached a seat. The stanchion 13, adjacent the illustrated seat, may be utilized to receive the apparatus constituting the receiving unit or apparatus for the fare of the passengers occupying the adjacent seat or seats. Such receiving apparatus is designated as a whole by the numeral 16 in Figure 1 and it may be attached to the stanchion 13 by means of a clamp 17, or the stanchion may be made in the form of a hollow tube, which tube may be used to form a part of the conduit to convey the fare to the fare-collecting apparatus located adjacent the driver's or conductor's seat. Such fare-receiving apparatus is designated generally by the numeral 18 in Figure 1, and is connected to the fare-receiving apparatus 16 by means of a conduit 19 in the form of a tube of substantially uniform diameter. A carrier 20, shown in dotted lines in Figure 1, is caused to travel to and fro between the fare-receiving apparatus 16 and the fare-collecting apparatus 18.

The fare-receiving apparatus 16 may assume the form of that illustrated in Figure 5 of the drawings, in which a generally tubular body or casing 21 is provided with a coin receiving slot or passageway 22, preferably of cylindrical form, and a coin-receiving receptacle 23, one side of which is open as indicated at 24 to permit the passenger to retain any coin that may be deposited in the slot 22, when the coin carrier presently to be further referred to is not in position to receive it. The tubular opening in the casing is provided with an annular shoulder 25 adjacent the coin-receiving receptacle 23, said shoulder constituting a stop for the movement of the carrier and thus serving to limit the movement of said carrier along the tubular portion 21, and to prevent the withdrawal of the carrier from said casing.

An enlargement 26 formed on the end of the casing 21 is provided with a fluid passage 27, of angular form, opening at one end in the receiver or receptacle 23 and at its opposite end in a valve-controlled passage 28 that is in communication with an opening 29 in the casing. Said opening 29 is adapted to be put in communication with any source of air under pressure by any suitable means. The flow of fluid from the opening 29 to the passage 27 is controlled by a valve 30, preferably of frustro-conical form, cooperating with a valve seat 31 formed at the end of passage 28. The valve 30 is guided in its movement by means of a stem 32 that snugly fits in a passage formed in the casing. The guide portion 32 of the valve 30 is integrally connected to the valve by a stem 33, that may be of triangular form or any other suitable form providing clearance between this portion and the wall of the passage 28 so that the fluid can pass from the opening 29 to the passage 27, when the valve is in its unseated position. A spring 34 abutting against a shoulder 35, and surrounding a cylindrical extension 36 from the valve, is utilized to normally maintain the valve in closed position, the end of the spring opposite from that contacting with shoulder 35 abutting against a removable cap 36' threaded in an enlargement of the casing. Said cap permits ready access to the spring and valve.

In order to close the coin-receiving slot 22 and the receiver opening 24, so that the pressure introduced to the passage 27 may become effective in advancing the carrier to the fare-collecting station, a unitary element 37 (Figure 6) is provided. Said element comprises a blade-like member 38 having an opening 39 positioned so that when the element is in its inoperative position said opening will register with the coin-receiving opening 22 in the casing.

Said element also comprises an operating stem 40 provided with a shoulder 41 which serves as an abutment for a collar 42 rigidly secured thereto. Said stem is also provided with a head 43 constituting a finger rest or handle whereby the element may be caused to reciprocate from the position in which the opening 39 is in registry with the fare-receiving slot 22, and from a position where the receiver opening 24 is uncovered, to a position in which the blade-like member 38 seals said opening and said slot.

To this end, the member 38 and the stem 40 are slidably guided in lateral projections 44 and 45 of the casing. A cylinder 46 is formed in the enlargement 44 to slidably receive the collar 42 above referred to. A coil spring 47 abutting against said collar and the bottom of said cylinder serves to maintain said elements in a position in which the coin receiving slot and the opening into the receiver at the bottom of the casing are exposed, Figure 5 illustrating such elements in partially advanced position, that is, in position to close the slot and openings just referred to, and ready to unseat the valve 30 to permit the flow of fluid into the casing.

In order that said element can unseat the valve after the slot 22 and opening 24 into the receiver casing is sealed, it is provided with an extension 48 entering an opening 49 in the bottom of the receiver in a position opposite the guide portion 32 of the valve, the arrangement being such that when the element that seals the openings in the casing, and is intended to actuate the valve admitting fluid to the casing, has covered said openings, that it will then unseat the valve 30 and permit the fluid to flow from the opening 29 through the passage 27 into the casing.

Said fluid becomes effective against a carrier 20 provided with packing sleeves or rings 51 and 52 to secure substantially fluid-tight engagement between the carrier and the walls of the tubular casing. Preferably, when the mechanism as just described, is used as one end of a fare conveying system or unit, the carrier will assume the form shown in Figure 7, which consists of a cylinder open at one end and provided with the packing rings just referred to, the carrier being arranged in the casing so that the open end thereof is disposed immediately below the inclined coin receiving slot 22 in the casing, in position to receive any coin that may be dropped through said slot, said coin droppng into the open end of the carrier under the action of gravity. When the device just described forms the receiving end of a change-making unit, such as hereinafter described, the carrier may assume the form shown in Figures 5 and 8 including an open-ended cylindrical body 53 divided between its ends by a transverse partition 54 so that the carrier provides, in effect, two open-ended containers, the open ends of which face in opposite direction for a purpose hereinafter described. Said carrier, as in the form previously described, includes packing rings of suitable material 51 and 52 providing substantially fluid-tight joints between the carrier and the walls of the conduit in which it moves.

The fare collection apparatus 18 shown in detail in Figure 4 preferably comprises a suitable generally tubular casing 57 connected at one end to the conveying tube 19 above referred to. In the hollow enlargement 58 of said casing an arm 59 is pivoted on a pin 60. Arm 59 is provided with a finger 61 that projects into the tubular portion of the casing 57 in the path of normal movement of carrier 20 in said casing. A fluid passage 62 is formed in an enlargement of the extension 58, said passage opening at one end into the tubular portion of the casing 57 and at its other end in a valve controlled passage 63, which in turn opens into a passage 64 that is adapted to be put in communication with a source of air under pressure. The flow of air from the passage 64 to the passage 62 is controlled by a valve 65 provided with a guiding portion 66 snugly fitting within the passage 63, the guiding portion 66 and the valve 65 being connected by means of a stem 67 that does not completely fill said passageway, so that when the valve is in its unseated position the air can flow around the stem 67 to the passage 62 and into the tubular portion of the casing 57 in back of the carrier 20. The valve guiding portion 66 extends into the casing extension 58 and is provided with a nose 68 that contacts with a lug 69 on the arm 59. Coil spring 70 abutting against a shoulder on the valve, and surrounding the cylindrical extension 71 thereof, serves to urge the valve toward its seated position. The spring 70 abuts against a cap 72 that is threaded upon a suitable extension of the casing 58, providing ready access to the spring 70 and the valve 65.

A cylindrical extension 73 of the tubular portion of the casing 57 provided with a cap 74, in which is mounted an eccentrically pivoted platform 75 swinging about suitable pintles or pins 76, said platform serving to normally close the end of the tubular conveyor in which the carrier 20 moves. The walls of the tubular extension 73 are constructed of transparent material, such as glass, so that the contents of this end of the conveying tube may be observed from the exterior of the end of the conveyor tube. The platform 75 is mounted so that normally it extends horizontally across the end of the tubular conveyor, making a fluid-tight engagement between the margins of the platform and the structure surrounding said margins. A suitable coin deflecting plate 77 is attached to an inner wall of the cylindrical extension 73 in position to deflect any coins projected in this portion of the conveyor upon the part of the platform to the left of pintle 76, as viewed in Figure 4, so that the weight of the coins will not serve to tilt the plate or platform 75 toward an open position rendering the fluid ineffective to return the carrier to the receiving end of the tubular conveyor in a manner hereinafter described.

In the operation of the invention so far described, the passenger entering the conveyance, after being seated, inserts a coin or token in the coin receiving slot 22. If the carrier 20 is in proper position in the path in which it travels, the coin drops into the open end of the carrier 20. At this time the element 37 is maintained in its elevated position by spring 47 so that the coin passes through the opening 39 in the blade-like portion 38 thereof. In the event that, for any reason, the coin receiver is not in proper position, the coin drops to the receiver 23 where it may be reclaimed by the passenger through the opening 24. Assuming that the receiver is in proper position, and the coin has been deposited into the receiver through the slot 22, the passenger then depresses the element 37 into the position shown in Figure 5 of the drawings, in which the coin-receiving slot 22 and the opening 24 are sealed by the passage of the blade-like portion of the element 37 across said slot and opening. This is accomplished in opposition to the spring 47. Further movement of the element 37 by the passenger, causes the end of projection 48 thereof to unseat the valve 30 against the action of the spring 34. The unseating of said valve causes a flow of fluid under pressure from opening 29 through the passages 26 and 27 into the tube of the conveyor. Said fluid under pressure causes a projection of the carrier 20 from the end of the tubular conveyor adjacent the coin-receiving apparatus to the fare-collecting apparatus 18, the sealing rings 51 and 52 preventing escape of the fluid around the carrier. During the movement of the carrier through tube 19 it is reversed to position so that it reaches the coin-collecting station adjacent the driver's seat in inverted position. The fare is accordingly dropped by gravity upon the platform 75, which extends normally horizontally across the end of the conveyor tube as above stated. The deposit of the fare or coin on said platform where it may be seen through the transparent walls of cylinder 73, gives the driver of the vehicle a visible indication that the passenger occupying the seat with which the conveyor is associated has paid his fare.

When the carrier 20 contacts with the finger 61 arranged in its path, its movement toward the platform 75 is arrested thereby and the momentum of the carrier causes a shifting of the arm 59 about the pivot 60 thereof. The movement of said arm causes an actuation of the valve 65, by contact of the lug 69 thereon with the nose 68 of the valve stem.

Prior to the time the carrier reaches the position shown in Figure 4, the valve 30 however will be automatically closed, relieving the fluid pressure urging the carrier toward the fare collecting station. This may be accomplished in any convenient manner. In the form of the invention illustrated in the drawings a dash-pot arrangement is disclosed insuring a closing of the valve 30 to the end that the fluid pressure admitted through passage 62 will surely be effective to cause the coin carrier to be returned to the coin-collecting station, illustrated in Figure 5. In the dash pot arrangement that is preferred, the casing 21 adjacent the upper end of the rod 40 is formed to provide a cylinder 46 in which the collar 42 rigidly secured to the rod 40 snugly fits, as above described, so that in effect said collar constitutes a piston moving in the cylinder 46. The normally open-ended cylinder 46 is closed by a cap 81 snugly fitting around the rod 40 and threadedly engaging the walls of said cylinder. In a lateral extension from casing 44, a passageway 82 is formed. Said passageway opens into a chamber 82' having grooves formed in the sides thereof to permit the flow of fluid around a ball valve 83 disposed reciprocably therein. A plug 84 having a restricted passage 85 closes the normally open end of said chamber. A relatively light spring 86 urges the ball valve 83 into position closing said passage 85.

By this arrangement, after the element 37 has been actuated by the passenger into a position in which the valve 30 is unseated and the coin carrier has been projected away from the coin-receiving station toward the fare-collecting station, the spring 47 promptly initiates the upward movement of said element. However, the air drawn into the chamber 46 upon actuation of said element through the passageway 35 and past the check-valve 83 resists the free return of said element in the direction of the spring 47. However, said element will slowly return to a position again opening the coin receiving slot 22 and the receiver slot 24 since the air entrapped in said chamber 80 flows slowly through passage 85. The parts are so proportioned and arranged that the openings 22 and 24 are exposed at the moment that the carrier 20 strikes the finger 61 of the arm 59. The unseating of the valve 65, resulting from the movement of the arm 59, causes a flow of fluid under pressure through the passages 63 and 62, which causes an immediate projection of the coin carrier back to the receiving station in position for the next operation of the device.

It will be understood that each seat within the vehicle is provided with a fare-receiving apparatus 16 associated by means of a conduit 19 with a fare collecting apparatus 18. The fare-collecting apparatuses are arranged side by side at one side of the driver's seat 12 over a fare receptacle 88 having a hopper 89 disposed in position to receive the fares when the operator tilts the platforms 75 by hand and causes the coins to drop into said hopper. Disposed within the receptacle 88 may be the usual registering and counting mechanism, the whole arrangement being such that the operator does not have access to the coins or tokens until they have been registered and counted in the mechanism in said receptacle in well known manner.

In order that the passengers entering the vehicle may provide themselves with the necessary change, in the event that they do not possess a coin of the desired denomination, this invention also contemplates the provision of a change-making system whereby the passenger can obtain change when needed, from a position adjacent his seat while the vehicle is proceeding over its route. In the vehicle of the application above referred to, in which the passenger seats are arranged in groups, it will be sufficient to provide change apparatus in each compartment. Figure 2 illustrates diagrammatically a preferred arrangement of the change-making system. In this figure, the numerals 90 and 91 designate the seats facing each other disposed in one of the compartments, 92 is the emergency door on the left side of the vehicle which is generally maintained closed. The apparatus 93 to receive the money that must be changed is preferably attached to the door 92. A suitable apparatus 94 is disposed adjacent the driver's seat 12, preferably at the opposite side thereof from the fare-collecting and registering arrangement before described. The devices 93 and 94 may assume the form of the fare-receiving device, shown in Figure 5 of the drawings, though inasmuch as the change making system is intended to carry larger coins than the fare usually demanded on public conveyances, the apparatus will be constructed of a larger size so as to conveniently handle said larger coins. In other respects, the change-making devices 93 and 94 correspond to the fare-receiving device illustrated in Figure 5 of the drawings. A conduit 95 is attached to the door 92, which is hinged at 92' (Figure 3) and when said door is in its normal or closed position, said conduit has its end thereof remote from the apparatus 93 in fluid tight engagement with the bell-shaped end 96 of conduit 97 and communicates at its opposite end to the apparatus 94 disposed adjacent the driver's seat.

In the use of the change-making system, a carrier such as shown in Figure 8 is employed for movement back and forth from the station in a compartment of the vehicle to the station adjacent to the driver's seat. In the operation of the change-making system, the passenger deposits the money in the coin-receiving slot 22 of the mechanism 93, which is closest his seat in the compartment of the vehicle that he occupies. After depositing the money, it drops into the compartment of the carrier 53 that opens toward the slot 22. After the money has been deposited, the passenger presses the element 37, causing the carrier 53 to be ejected into the apparatus 94 disposed adjacent the driver's seat. Immediately upon release of the element 37, the spring 47 becomes effective to move it toward its inoperative position, by a delayed action, in the manner above described so that when carrier 53 reaches the apparatus 94 adjacent the driver's seat the flow of fluid through the passage 27 is cut off and the receiving slot 22, as well as the opening 24 in receiver 23, are open. When the carrier 53 reaches the apparatus 94, the money transmitted to the driver by the passenger is projected into the receiver 23 of that apparatus. The driver can at his leisure remove the money from the receiver and insert the proper change in the slot 22 forming a part of the apparatus 94. The driver then actuates the element 37 forming a part of that apparatus, and in the manner before described, causes the carrier to be returned to the passenger compartment. Upon return of the carrier 53 to said compartment, the change which is carried thereby is dropped into the receiver 23 where it may be obtained by the passenger. The passenger being thus provided with the necessary change deposits his fare in the fare-collection system which serves to automatically convey it to the fare-receiving receptacle 88 in the manner before described.

By the system above described the driver of the vehicle need give no further attention to the collection of fares than to see that a fare reaches the transparent extension 73 associated with the conveying system of each occupied seat. When the vehicle is used on a route passing through more than one fare zone the operator can permit the fares to remain in the transparent cylinder 73 until he is ready to cross a zone line, when he can blank the entire system by causing the fares to be dropped into a hopper 89 and counted and registered by the mechanism disposed in the receptacle 88. The driver can then call upon the passengers in the conveyance for a further fare.

In the use of the proposed system it is contemplated that the passengers be requested to board the conveyance with the proper fare, but in the event that the passenger should not do so the change may be obtained from the driver by utilizing the change-making system above described. The driver can make the necessary change with a minimum of effort so that the movement of the vehicle over its route is not substantially interrupted by the requirement that the driver occasionally provide passengers in various parts of the vehicle with the necessary change.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by U. S. Letters Patent is:—

1. The method of collecting fares as an incident to the operation of public conveyances, which consists in first permitting the passenger to occupy a seat, and then causing the fare of the passenger to be automatically conveyed to an inspection point adjacent the operator of the conveyance from adjacent said seat on the initiative of the passenger; said inspection point being individual to said seat whereby the operator may inspect and identify the fares deposited from the various seats at his convenience.

2. The method of collecting fares as an incident to the operation of public conveyances, which consists in first permitting the passenger to occupy a seat, and then causing the fare of the passenger to be pneumatically conveyed to the operator of the conveyance from adjacent said seat on the initiative of the passenger.

3. A system of vehicle fare collection comprising a fare receiving station, a fare-collecting station at a point remote from said receiving station, a carrier, means to guide said carrier from one of said stations to the other, mechanism at said receiving station to cause said carrier to be projected to said collecting station, and mechanism to automatically return said carrier to the receiving station.

4. A pneumatic system of vehicle fare collection, comprising a fare-receiving station, a fare-collecting station at a point remote from said receiving station, a tube connecting said stations, a carrier fitting said tube and mounted for back-and-forth movement in said tube, a coin slot in said tube, and mechanism to close said coin slot and to cause said carrier to be automatically projected pneumatically from said receiving to said collecting station.

5. The combination defined in claim 4 including mechanism disposed at said collecting station to automatically return said carrier to said receiving station after delivery of said fare.

6. A vehicle pneumatic delivery and return system comprising two stations, disposed at spaced points of the vehicle and connected together by a tube, a carrier in said tube, a receiver at each station, valve means associated with said tube at each station to control the flow of a fluid to said tube to project said carrier to the other station, an opening in said tube at each station to permit the insertion of an article in said carrier, and a unitary member at each station to control said valve means and simultaneously close said opening.

7. The combination defined in claim 6 in which said carrier consists of an open-ended member divided into two receptacles by partitioning means spaced inwardly from said open ends.

8. A vehicle pneumatic delivery and return system consisting of a tube extending from one station to another station within the vehicle body, a carrier within said tube, pneumatic means to project said carrier between said stations, and stops for said carrier at each station preventing withdrawal of the carrier.

9. A vehicle pneumatic delivery and return system consisting of a tube extending from one station to another station within the vehicle body, a carrier within said tube, a receiver opening adjacent each end of said tube, a further opening in said tube at each station to permit loading of the carrier without removal thereof from said tube, pneumatic means to project said carrier between said stations, and mechanism to close both of said openings and control said pneumatic means when the carrier is to be projected from one station to the other.

10. A vehicle fare collecting system comprising a fare receiving station, a fare-collecting station, a tube connecting said stations, a receiver at said collecting station forming a continuation of said tube and having a transparent wall, pneumatically operated means to carry a fare from said receiving to said collecting station and deliver it into said receiver, and manually controlled means to discharge the fare from said receiver.

11. A vehicle fare collecting system comprising a fare receiving station, a fare-collecting station, a tube connecting said stations, a receiver at said collecting station forming a continuation of said tube and having a transparent wall, pneumatically operated means to carry a fare from said receiving to said collecting station and deliver it into said receiver, and a pivoted platform to receive said fare arranged so as to be closed under fluid pressure during the operation of said means.

12. A pneumatic coin conveying system, comprising a conveyor tube, a carrier in said tube, a coin slot in said tube in position to pass a coin into the carrier when the latter is in receiving position, valve means to control the flow of fluid to said tube to project said carrier along said tube, and a unitary element arranged to close said slot and substantially simultaneously actuate said valve means.

13. A pneumatic coin conveying system, comprising a conveyor tube, a carrier in said tube, a coin slot in said tube in position to pass a coin into the carrier when the latter is in receiving position, valve means to control the flow of fluid to said tube to project said carrier along said tube, an element arranged to close said slot upon operation thereof, and substantially simultaneously actuate said valve means, spring means to urge said element into position in which said slot is open and mechanism to retard the action of said spring means.

14. A pneumatic coin conveying system, comprising a conveyor tube, a carrier in said tube, a coin slot in said tube in position to pass a coin into the carrier when the latter is in receiving position, valve means to control the flow of fluid to said tube to project said carrier along said tube, a receiver opening in said tube, and a unitary plunger to close said coin slot and receiver opening and substantially simultaneously actuate said valve means.

15. A pneumatic coin conveying system, comprising a conveyor tube, a carrier in said tube, a coin slot in said tube in position to pass a coin into the carrier when the latter is in receiving position, valve means to control the flow of fluid to said tube to project said carrier along said tube, a receiver opening in said tube, a plunger to close said coin slot and receiver opening and substantially simultaneously actuate said valve means, and mechanism to return said plunger to its position in which said slot and opening are uncovered, said mechanism having a delayed action, so that the fluid may be effective to project said carrier along said tube.

16. The combination defined in claim 15 including mechanism at a point in said tube remote from said coin slot to automatically return said carrier to a position between said slot and opening, said mechanism including an element actuated by the carrier to cause the return thereof.

17. In a vehicle, a plurality of passenger seats; a fare depository adjacent each seat; fare collecting means at a point in the vehicle remote from said seats embodying a fare receiving section individual to each of said seats; and means to convey fares from said depositories to said individual receiving sections.

18. The combination as set forth in claim 17 in which said last mentioned means comprises pneumatically impelled mechanism for conveying said fares from said depositories to the receiving sections individual thereto.

19. In combination, a plurality of seats, a depository adjacent each seat; a collection station remote from said seats embodying a receiving section individual to each depository; and means for conveying objects from said depositories to said individual sections.

20. In combination, a plurality of separate depositories for coins, tokens and the like; a collection station remote from said depositories embodying a receiving section individual to each depository; and mechanism for conveying coins, tokens and the like deposited in said depositories to the receving section individual thereto.

21. In a collection system, receiving depositories for coins, tokens, and the like; a collection receptacle constructed to permit convenient inspection of objects deposited therein; and means for conveying objects from said depositories and depositing the same in said collection receptacle in such manner that the position of the object in said receptacle will indicate the depository from which the object was conveyed.

22. In combination with a vehicle embodying a plurality of passenger seats arranged in a compartment, fare depositories in said compartment adjacent said seats; a driver's position outside of said compartment, fare collecting means located adjacent said driver's position permitting convenient inspection of the fares deposited therein from said driver's position; and means for conveying fares deposited in said depositories to said fare collecting means in a manner indicating the depository from which the fare has been conveyed.

23. In combination with a vehicle embodying a plurality of passenger seats arranged in separate compartments; fare depositories in said compartments; a driver's position in the forward end of the vehicle; fare receiving means located adjacent the driver's position constructed to permit convenient inspection of fares from the driver's position; and means for conveying fares from said depositories to said fare receiving means and depositing the same in said fare receiving means in a manner indicating the seat for which the fare has been deposited.

24. The combination as set forth in claim 23 together with additional conveying means between said compartments and said driver's position for making change, collecting tickets and transfers, and like operations whereby the entire fare collection transaction may be carried out between said driver's position and said seats.

25. In a collection system, the combination of a receiving station subdivided into a plurality of compartments; a plurality of depositories for objects to be collected remote from said receiving station to each of which one of said compartments is allotted; means connecting each depository with the compartment alloted thereto; and means for impelling the objects to be collected from said depositories through said connecting means to the compartments allotted thereto.

26. In a collection system, the combination of a receiver provided with a plurality of compartments in which deposited objects are visible for inspection; a plurality of depositories remote from said receiver to each of which one of the compartments is allotted; separate guideway connecting each depository with the compartment allotted thereto; and pneumatically operated means for impelling objects deposited in said depositories through said guideways to the compartments allotted thereto.

27. In a collection system, the combination of a receiving station having a plurality of compartments; a plurality of depositories remote from said receiver to each of which one of the compartments is allotted; means connecting each depository with the compartment allotted thereto; means for impelling objects deposited in said depositories through said connecting means to said depositories; a collection receptacle; and means controlling the discharge of objects from said compartments to said receptacle.

28. In a pneumatic despatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, and means for despatching the carrier from the terminal by setting up a flow of transporting air against one end of the carrier therein, said means acting simultaneously to close the escape outlet.

29. In a pneumatic despatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening and escape outlet, and means, actuated by the closing movement of the cover, for setting up a flow of transporting air against one end of the carrier in the terminal for despatching the carrier therefrom.

30. In a pneumatic despatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a valve in the terminal through which, when open, a flow of transporting air is directed against one end of the carrier in the terminal to despatch the carrier therefrom, and means for closing said opening and escape outlet and for opening said valve.

31. In a pneumatic despatch system including a transit tube, a carrier having an opening therein and reciprocable in said tube, terminals connected by said tube, each terminal including an extension of the transit tube in which extension the carrier rests when at said terminal, said extension having an opening therein which registers with the carrier opening when the latter is in the terminal, an outlet through which air in the tube escapes, a cover for closing said opening and escape outlet, a valve in the terminal through which, when open, a flow of transporting air is directed against one end of the carrier in the terminal to despatch the carrier therefrom, and means actuated by the cover during its closing movement for opening said valve.

32. A pneumatic despatch system including a transit tube, terminals connected thereby and means for setting up a flow of air in the tube for transporting carriers from one terminal to the other, said terminals including means which permit access to the interior of the carrier while the latter is located therein.

33. A pneumatic despatch system including a transit tube, terminals connected thereby and means for setting up a flow of air in the tube for transporting a carrier from one terminal to the other, said terminals including means which prevent removal of the carrier therefrom.

34. A pneumatic despatch system including a transit tube, terminals connected thereby and means for setting up a flow of air in the tube for transporting a carrier from one terminal to the other, said terminals including means which prevent removal of the carrier therefrom while permitting access to the interior of the carrier.

35. A pneumatic despatch system including a transit tube, terminals connected thereby and means for setting up a flow of air in the tube for transporting a carrier from one terminal to the other, said terminals including openings in the walls thereof through which access to the interior of the carrier when the latter is located therein may be had.

36. In a pneumatic despatch system comprising terminals and a transit tube connecting said terminals each of said terminals having an opening therein, a carrier having an opening in one wall thereof and means for insuring the registration of the opening in the carrier with the openings in said terminals, whereby access may be had to the interior of the carrier at either terminal without removal of the carrier therefrom.

37. In a pneumatic despatch system including a terminal and a transit tube by which a carrier is delivered to and despatched from the terminal, said terminal having an opening therein through which access may be had to the interior of the carrier, carrier engaging means which prevent the removal of the carrier from the terminal.

38. In a pneumatic despatch system including a terminal and a transit tube by which a carrier is delivered to and despatched from the terminal, said terminal having an opening therein through which access may be had to the interior of the carrier, carrier engaging means which prevent the removal of the carrier from the terminal, said means including a portion which projects into the path of travel of the carrier and engages it upon its arrival at the terminal.

39. In combination, a plurality of separate depositories for coins, tokens and the like, a collection station remote from said depositories embodying a receiving section individual to each depository, means for conveying coins, tokens and the like deposited in said depositories to the receiving section individual thereto, and separate conveying means between said depositories and said collection station for making change whereby the entire collection transaction may be carried out between said depositories and said collection station.

40. The combination as set forth in claim 39 in which said means for conveying coins, tokens and the like, and said separate conveying means, comprise a tube, and a carrier within said tube adapted to be pneumatically propelled therein between the depositing individual to said tube and the collection station.

FRANK R. FAGEOL.
WILLIAM B. FAGEOL.